(12) United States Patent
Winer et al.

(10) Patent No.: US 10,045,011 B2
(45) Date of Patent: Aug. 7, 2018

(54) PROVIDING TIMING INFORMATION OVER A DATA LINK

(75) Inventors: Paul Winer, Santa Clara, CA (US); Sunil K. Jain, Portand, OR (US)

(73) Assignee: Intel Corporation, Santa Clara, CA (US)

(*) Notice: Subject to any disclaimer, the term of this patent is extended or adjusted under 35 U.S.C. 154(b) by 881 days.

(21) Appl. No.: 13/995,577

(22) PCT Filed: Dec. 28, 2011

(86) PCT No.: PCT/US2011/067552
§ 371 (c)(1),
(2), (4) Date: May 30, 2014

(87) PCT Pub. No.: WO2013/100957
PCT Pub. Date: Jul. 4, 2013

(65) Prior Publication Data
US 2014/0267634 A1    Sep. 18, 2014

(51) Int. Cl.
| | | |
|---|---|---|
| H04N 13/04 | (2006.01) |
| H04N 21/41 | (2011.01) |
| H04N 21/426 | (2011.01) |
| H04N 21/43 | (2011.01) |
| H04N 21/4363 | (2011.01) |
| H04N 21/81 | (2011.01) |

(52) U.S. Cl.
CPC ..... *H04N 13/0497* (2013.01); *H04N 21/4122* (2013.01); *H04N 21/4126* (2013.01); *H04N 21/42684* (2013.01); *H04N 21/4302* (2013.01); *H04N 21/43637* (2013.01); *H04N 21/816* (2013.01)

(58) Field of Classification Search
CPC ............. H04N 13/0497; H04N 21/816; H04N 21/4302; H04N 21/4126; H04N 21/42684; H04N 21/43637; H04N 21/4122
USPC .......................................................... 348/51
See application file for complete search history.

(56) References Cited

U.S. PATENT DOCUMENTS

| | | | |
|---|---|---|---|
| 8,861,505 B1 * | 10/2014 | de la Broise | ......... H04J 3/0658 370/310 |
| 2003/0198257 A1 | 10/2003 | Sullivan et al. | |
| 2004/0237120 A1 | 11/2004 | Lewin et al. | |
| 2004/0244057 A1 | 12/2004 | Wallace et al. | |
| 2011/0090897 A1 | 4/2011 | Johnson et al. | |

(Continued)

FOREIGN PATENT DOCUMENTS

WO    2013/100957 A1    7/2013

OTHER PUBLICATIONS

International Search Report and Written Opinion received for PCT application No. PCT/US2011/067552, dated Jan. 3, 2013, 9 pages.

(Continued)

*Primary Examiner* — Allen Wong
(74) *Attorney, Agent, or Firm* — Jordan IP Law, LLC

(57) ABSTRACT

Systems and methods may involve minimizing interference when synchronization information is being transmitted from multiple sources. This may include receiving a trigger signal wherein the trigger signal includes a timing parameter to be used by a user device to synchronize with a content platform, and transmitting a synchronization signal having a transmitter identification and the timing parameter.

20 Claims, 4 Drawing Sheets

(56) References Cited

U.S. PATENT DOCUMENTS

| 2011/0268196 | A1* | 11/2011 | Suh | H04N 13/0048 |
| | | | | 375/240.26 |
| 2012/0133491 | A1* | 5/2012 | Yamashita | G06K 19/0723 |
| | | | | 340/10.51 |
| 2012/0229250 | A1* | 9/2012 | Lim | G06F 21/84 |
| | | | | 340/5.8 |

OTHER PUBLICATIONS

International Preliminary Report on Patentability and Written Opinion received for PCT Patent Application No. PCT/US2011/067552, dated Jul. 10, 2014, 6 Pages.

* cited by examiner

PROVIDING TIMING INFORMATION OVER A DATA LINK

BACKGROUND

Technical Field

Embodiments generally relate to providing timing information over a data link. More particularly, embodiments relate to minimizing interference when synchronization information is being transmitted from multiple sources.

Discussion

Stereoscopic three-dimensional (3D) broadcasts may involve a content broadcasting source sending a synchronization signal to coordinate opening and closing of a right eye shutter and a left eye shutter of user-worn glasses to produce a 3D image. However, in the case of more than one content broadcasting source, there may a danger of signal interference.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include a system including a content platform having a content engine to broadcast content with a first processor and a first memory, a display device to display the content, and a transmitter device to transmit a synchronization signal, wherein the synchronization signal includes a transmitter identification and a timing parameter. The system may also include a user device having a receiver device to receive the synchronization signal, to utilize the transmitter identification to determine the identity of the content platform, and to utilize the timing parameter to synchronize with the content engine.

Embodiments may also include an apparatus having a transmitter device storage component to store a transmitter identification, a number generator to generate a number generator number, and a counter to count a counter number. The apparatus may also have a transmitter device compare component to compare the number generator number and the counter number, and a transmitter to transmit a synchronization signal to a user device.

Embodiments may also involve a computer implemented method including receiving a trigger signal, wherein the trigger signal includes a timing parameter to be used by a user device to synchronize with a content platform, generating a number generator number, and counting a counter number. The computer implemented method may also include comparing the number generator number and the counter number, and transmitting a synchronization signal including a transmitter identification and the timing parameter.

Figure 1:
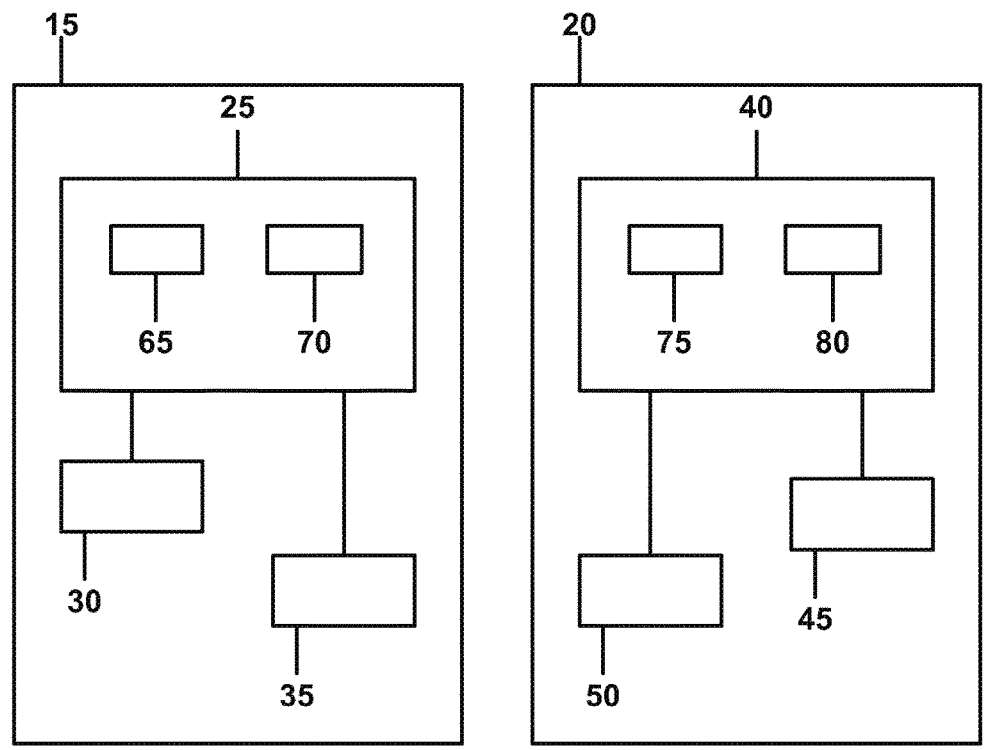
FIG. 1 is a block diagram of a computing system configured to minimize interference when synchronization information is being transmitted from multiple sources in accordance with an embodiment of the invention.

Turning now to FIG. 1, a block diagram of a computing system 10 configured to minimize interference when synchronization information is being transmitted from multiple sources is shown. The computing system 10 may include a first content platform 15, a second content platform 20, and a user device 55.

The first content platform 15 may include a first content engine 25, including a first processor 65 and a first memory 70. The first content engine 25 may be coupled to a first display 30 and a first transmitter device 35. The first content platform 15 may broadcast content to a user using the user device 55 (e.g., a pair of 3D viewing glasses), and may also utilize the first transmitter device 35 to transmit a first synchronization signal that may be received at the user device 55.

The second content platform 20 may include a second content engine 40, including a second processor 75 and a second memory 80. The second content platform 40 may be coupled to a second display 45 and a second transmitter device 50. The second content platform 40 may broadcast content to a user using the user device 55, and may also utilize the second transmitter device 50 to transmit a second synchronization signal that may be received at the user device 55.

The user device 55 may include a receiver device 60, which may be configured to accept a synchronization signal from a desired content platform, while discarding synchronization signals from other content platforms. For example, the user device 55 may be configured to receive synchronization signals from the first transmitter device 35, and the disregard synchronization signals from the second transmitter device 50. Among other things, the synchronization signal from the first transmitter device 35 may be utilized to synchronize the operation of the user device 55 with the operation of the first content platform 15 to provide a stereoscopic effect for a user viewing the broadcast content of the first content platform 15.

The arrangement and numbering of blocks depicted in FIG. 1 is not intended to imply an order of operations to the exclusion of other possibilities. Those of skill in the art will appreciate that the foregoing systems and methods are susceptible of various modifications and alterations. For example, in the embodiment described in FIG. 1, the first display 30 may be separate from the first transmitter device 35. However, in other embodiments, the first transmitter device may be integrated with the first display.

Figure 2:
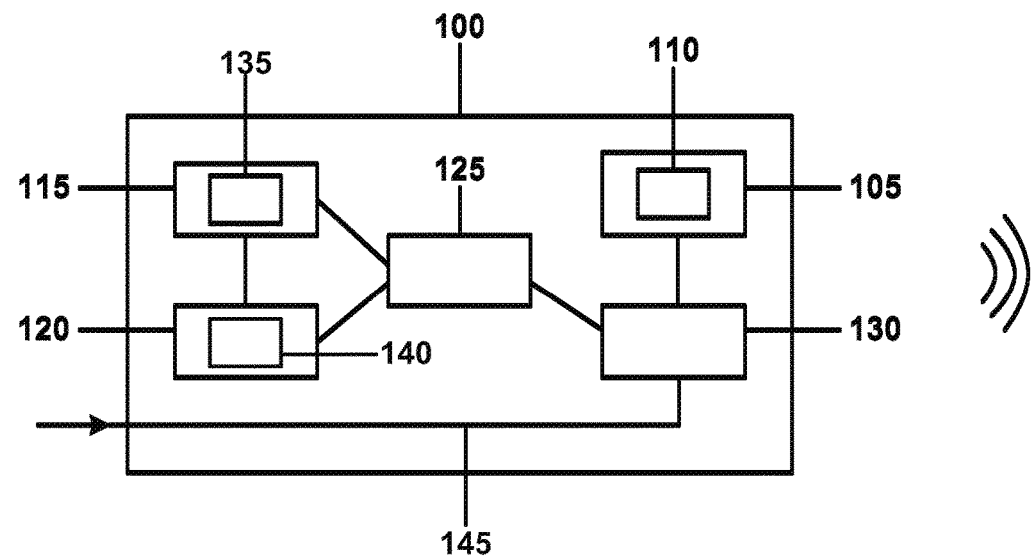
FIG. 2 is a block diagram of a transmitter apparatus configured to minimize interference when synchronization information is being transmitted from multiple sources in accordance with an embodiment of the invention.

Turning now to FIG. 2, a transmitter apparatus 100 configured to minimize interference when synchronization information is being transmitted from multiple sources is shown. The transmitter device 100 may include a transmitter device storage component 105, a number generator 115, a counter 120, a transmitter device compare component 125, and a transmitter 130.

The transmitter device storage component 105 may be a data storage unit, such as, a register location, a logic component, a read-only memory (ROM) component, a data array, or the like. The transmitter device storage component 105 may store a transmitter identification (ID) 110, which may identify the transmitter device 100 (and, by extension, a coupled content platform) to a user device, such as the user device 55 (FIG. 1). The transmitter ID 110 may be a fixed ID, or may be programmable.

The number generator 115 may be configured to generate a number that may be utilized to transmit a synchronization signal. In this embodiment, the number generator 115 may be a linear feedback shift register (hereinafter referred to as "the LFSR number generator 115"). In this embodiment, the LFSR number generator 115 may pseudo-randomly generate a number generator number 135 (also referred to as "the LFSR number generator number 135") between 0 and non-zero number, N. In other embodiments, the number generator may generate a number randomly.

The counter 120 may be a device configured to count a counter number 140 from zero to a non-zero number X, and then return to zero and repeat. In this embodiment, the number X may be equal to the number N. In other embodiments, this may not be the case.

A number generator and a counter may be utilized to prevent interference when transmitting synchronization signals from multiple transmitter devices. Specifically, as will be discussed in greater detail, a number generator and a counter may be utilized to randomly or pseudo-randomly initiate transmission of a synchronization signal, thereby minimizing the probability that two synchronization signals from two different content platforms will be transmitted over one another.

The transmitter device compare component 125 may configured to make a comparison, and act according to the outcome of the comparison. For example, in this embodiment, the transmitter device compare component 125 may be configured to compare the LFSR number generator number 135 with the counter number 120, and generate a signal to the transmitter 130.

The transmitter 130 may be used to at least one of modulate, encode, and transmit a synchronization signal to another device, such as the user device 55 (FIG. 1). For example, in this embodiment, the transmitter 130 may be a light-emitting diode (LED) that may transmit a synchronization signal in infrared (IR). In other embodiments, the transmitter may be a device that may communicate with other devices (e.g., printer 302) via a wireless data connection (e.g., IEEE 802.11, 1999 Edition, LAN/MAN Wireless LANS (WiFi), IEEE 802.16-2004, LAN/MAN Broadband Wireless LANS (WiMAX), Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X1.0, IEEE P1675), USB (e.g., Universal Serial Bus 2.0 Specification)), etc., depending upon the circumstances.

In this embodiment, the transmitter device 100 may receive a trigger signal 145 from a content engine, such as the content engine 25 (FIG. 1). The trigger signal 145 may include, among other things, a timing parameter that may be used by the user device to synchronize with a content platform, such as the content platform 15 (FIG. 1). By way of example, the transmitter device 100 may transmit a synchronization signal at the beginning of every frame of content (e.g., during vertical blank). Generally concurrently, the LFSR number generator 115 may be generating the LFSR number generator number 135 (e.g., pseudo-randomly), and the counter 120 may be counting the counter number 140.

Also generally concurrently, the transmitter device compare component 125 may compare the LFSR number generator number 135 and the counter number 140. If the LFSR number generator number 135 and the counter number 140 in a particular comparison are the same, the transmitter device compare component 125 may generate a signal to the transmitter 130 to transmit a synchronization signal to the user device. The synchronization signal may include the transmitter ID 110 from the storage component 105, and the trigger signal 145 including a timing parameter that may be utilized to synchronize the operation of the user device with the operation of the content platform. If, on the other hand, the LFSR number generator number 135 and the counter number 140 are not the same, the synchronization signal may not be sent.

The arrangement and numbering of blocks depicted in FIG. 2 is not intended to imply an order of operations to the exclusion of other possibilities. Those of skill in the art will appreciate that the foregoing systems and methods are susceptible of various modifications and alterations. In the embodiment described in FIG. 2, the synchronization signal may include the transmitter ID 110 and the trigger signal 145 including a timing parameter. However, in other embodiments, the synchronization signal may include additional information relevant to the synchronization of a user device with a content platform. For example, the synchronization signal may also include timing information regarding when the next synchronization signal may be transmitted. Alternately, the synchronization signal may include a seed number being used in the number generator in a transmitter device, so that a number generator in a receiver device may utilize this seed number to anticipate a next transmission of a synchronization signal.

Figure 3:
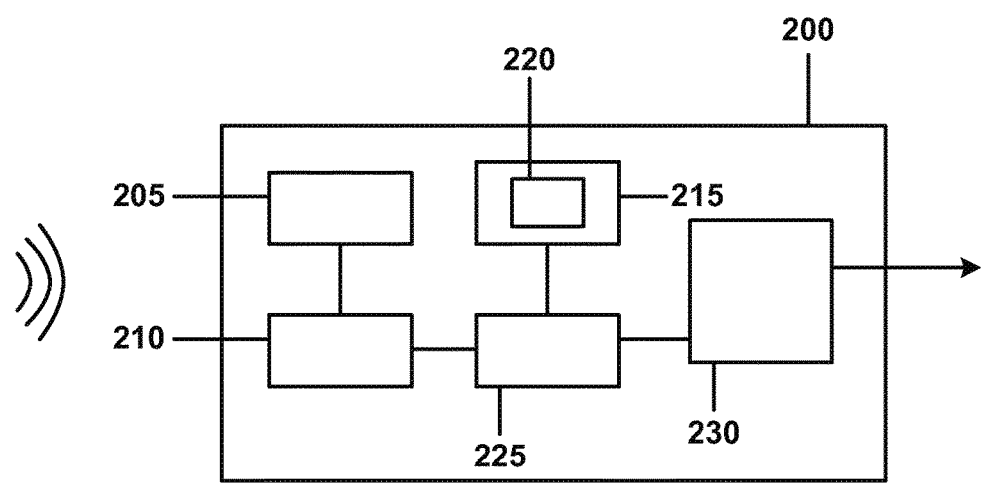
FIG. 3 is a block diagram of a receiver apparatus configured to minimize interference when synchronization information is being transmitted from multiple sources in accordance with an embodiment of the invention.

Turning now to FIG. 3, a receiver device 200 configured to minimize interference when synchronization information is being transmitted from multiple sources is shown. The receiver device 200 may include a receiver sensor 205, a receiver 210, a receiver device storage component 215, a receiver device compare component 225, and a control system 230.

The receiver device sensor 205 may be a sensor to detect transmission of electromagnetic energy from a transmitting device, such as the transmitting device 100 (FIG. 2). In this embodiment, the receiver device sensor 205 may be a photo detector, and may be utilized to detect an infrared (IR) transmission.

The receiver 210 may be used to at least one of receive, demodulate, and decode a synchronization signal sent from a transmitter device, such the transmitter device 35 (FIG. 1). In this embodiment, the receiver 210 may be utilized to receive, demodulate, and decode a synchronization signal sent from a transmitter device to extract, among other things, a transmitter ID, such as the transmitter ID 110 (FIG. 2), and a trigger signal, such as the trigger signal 145 (FIG. 1), including a timing parameter.

The receiver device storage component 215 may be a storage unit, such as, a register location, a logic component, a data array, or the like. The receiver device storage component 215 may store a match identification (ID) 220. The match ID 220 may be an identification code that may be used to validate the identity of the transmitter device. For example, the match ID 220 may be stored in the receiver device storage component 215 after being received as part of a pairing process with a transmitter device of a desired content platform, such as the first content platform 15 (FIG. 1).

The receiver device compare component 225 may be configured to make a comparison, and act according to an outcome of the comparison. For example, in this embodiment, the receiver device compare component 225 may be configured to compare the match ID 220 with the received transmitter ID included in the synchronization signal sent from the transmitter device.

The control system 230 may be configured to generate a signal whose phase is related to a phase of an input "reference" signal. In this embodiment, the control system may be a phase lock loop. This control system 230 may keep the user device in phase with a content engine, such as the first content engine 25 (FIG. 1), even if an incoming synchronization signal is occasionally blocked.

In this embodiment, the receiver device 200 may utilize the receiver device sensor 205 to detect an incoming synchronization signal received from a transmitter device. Upon receiving the synchronization signal, the receiver 210 may demodulate the synchronization signal. At this point, the receiver device compare component 225 may compare the received transmitter ID with the match ID 220 stored in the receiver device storage component 215. If the transmitter ID does not match the match ID 220, the received synchronization signal may be ignored. It on the other hand, the transmitter ID does match the match ID 220, then the synchronization signal from the content engine may be validated, and the information included in the trigger signal may be forwarded to the control system 230. The control system 230 may utilize the information included in the received trigger signal to remain in phase the desired content engine.

The arrangement and numbering of blocks depicted in FIG. 3 is not intended to imply an order of operations to the exclusion of other possibilities. Those of skill in the art will appreciate that the foregoing systems and methods are susceptible of various modifications and alterations. For example, in the embodiment described in FIG. 3, the match ID 220 stored in the receiver device storage component 215 may be compared with the received transmitter ID to determine whether a synchronization signal is valid. However, in other embodiments, additional verification methods may be utilized as well. For example, other embodiments may incorporate a cyclic redundancy check (CRC) to validate a synchronization signal received from a transmitter device, and to ensure that information contained within a synchronization signal (e.g., the transmitter ID, the timing parameter) is not corrupted. In still other embodiments, the inclusion of a separate timing parameter may be rendered unnecessary by configuring a receiver device to interpret a timing mark to be at a beginning (or end) of a transmitter ID portion of the synchronization signal.

Figure 4:
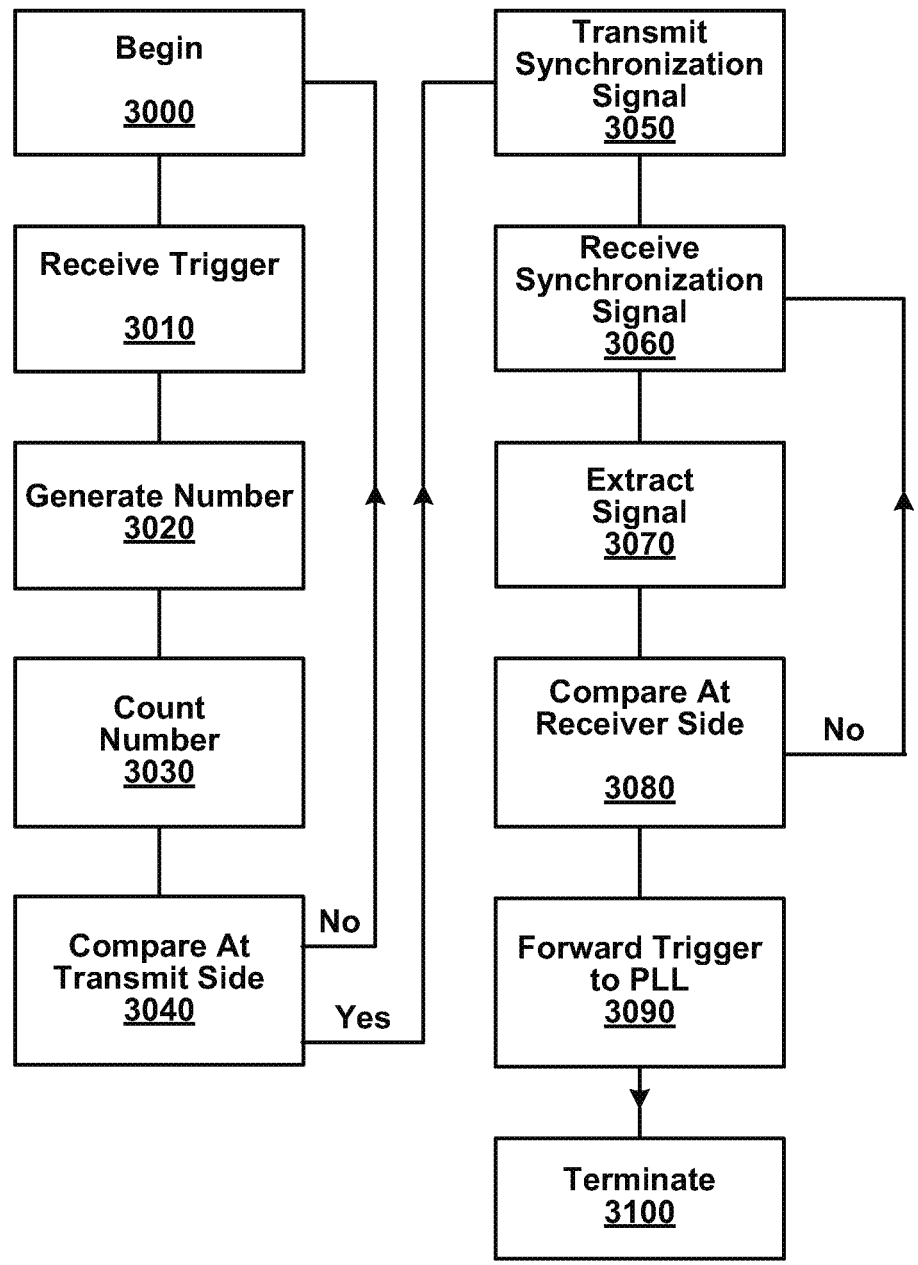
FIG. 4 is a flowchart of a method of providing synchronization information over a communication link while minimizing interference in accordance with an embodiment of the invention.

Turning now to FIG. 4, a flowchart of a method that overcomes interference issues when synchronization information is being transmitted from multiple sources in accordance with an embodiment of the invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

The process may begin at processing block 3000. At processing block 3010, a transmitter device, such as the transmitter device 100 (FIG. 2), may receive a trigger signal, such as the trigger signal 145 (FIG. 2) from a content engine, such as the content engine 25 (FIG. 1). The trigger signal may include, among other things, a timing parameter that may be used by a user device, such as user device 55 (FIG. 1), to synchronize with a content platform, such as the content platform 15 (FIG. 1).

At processing block 3020, a number generator, such as LFSR number generator 115 (FIG. 2), may generate a number generator number, such as the LFSR number generator number 135 (FIG. 2). At processing block 3030, a counter, such as the counter 120 (FIG. 2), may generate a counter number, such as the counter number 140 (FIG. 2).

At processing block 3040, the number generator number and the counter number may be sent for comparison to a transmitter device compare component, such as the transmitter device compare component 125 (FIG. 2). If the number generator number and the counter number are the same, the transmitter device compare component may, at processing block 3050, generate a signal to a transmitter, such as the transmitter 130 (FIG. 2), to transmit a synchronization signal. The synchronization signal may include, for example, a transmitter ID, such as the transmitter ID 110 (FIG. 2), and the trigger signal including the timing parameter. On the other hand, if the number generator number and the counter number do not match, the synchronization signal may not be transmitted, and the process may return to processing block 3000.

At processing block 3060, a receiver device, such as the receiver device 200 (FIG. 3) may utilize a receiver device sensor, such as the receiver device sensor 205 (FIG. 3), to detect a synchronization signal sent from the transmitter device. At processing block 3070, a receiver, such as the receiver 210 (FIG. 3), may demodulate the synchronization signal to extract the transmitter ID and the trigger signal including the timing parameter.

At processing block 3080, a receiver device compare component, such as the receiver device compare component 225 (FIG. 3), may compare the received transmitter ID with a match ID, such as the match ID 220 (FIG. 3). If the transmitter ID does not match the match ID 220, the received synchronization signal may be ignored and the process may return to processing block 3060. If, on the other hand, the transmitter ID matches the match ID 220, then at processing block 3090, the synchronization signal from the particular transmitter device may be validated, and the information included in the trigger signal may be forwarded to a control system, such as the control system 230 (FIG. 3). The control system may utilize the trigger signal to synchronize the user device with a content engine. At processing block 3100, the process may terminate.

The sequence and numbering of blocks depicted in FIG. 4 is not intended to imply an order of operations to the exclusion of other possibilities. Those of skill in the art will appreciate that the foregoing systems and methods are susceptible of various modifications, variations, and alterations. For example, in the embodiment described in FIG. 4, a receiver device compare component may compare the received transmitter ID with a match ID to determine the validity of a received synchronization signal. However, in another embodiment, the receiver device may incorporate additional verification methodologies (e.g., a CRC mechanism) to determine the validity of a synchronization signal.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

We claim:

1. A system comprising:
   a content platform including,
      a content engine to broadcast content having a first processor and a first memory;
      a display device to display the content; and
      a transmitter device to transmit a synchronization signal, wherein the synchronization signal includes a transmitter identification and a timing parameter; and
   a user device including a receiver device to receive the synchronization signal, to utilize the transmitter identification to determine the identity of the content platform with respect to one or more other content platforms, and to utilize the timing parameter to synchronize with the content engine such that a synchronization signal from the content platform is received and a synchronization signal from the one or more other content platforms is disregarded to minimize interference due to synchronization information being transmitted from multiple sources.

2. The system of claim 1, wherein the transmitter device includes,
   a transmitter device storage component to store the transmitter identification;
   a number generator to generate a number generator number;
   a counter to count a counter number;
   a transmitter device compare component to compare the number generator number and the counter number; and
   a transmitter to transmit the synchronization signal to the user device.

3. The system of claim 2, wherein the number generator number is generated pseudo-randomly.

4. The system of claim 2, wherein the transmitter device compare component generates a signal to direct the transmitter to transmit the synchronization signal to the user device.

5. The system of claim 1, wherein the receiver device includes,
   a receiver sensor to detect the synchronization signal;
   a receiver to extract the transmitter identification and the timing parameter from the synchronization signal;
   a receiver device storage component to store a match identification; and
   a receiver device compare component to compare the transmitter identification and the match identification to validate the synchronization signal.

6. The system of claim 5, wherein the receiver device further includes a control system to synchronize the user device with the content engine.

7. The system of claim 5, wherein a cyclic redundancy check is executed to validate the synchronization signal.

8. An apparatus comprising:
   a transmitter device storage component to store a transmitter identification of a content platform;
   a number generator to generate a number generator number;
   a counter to count a counter number;
   a transmitter device compare component to compare the number generator number and the counter number; and
   a transmitter to transmit a synchronization signal for the content platform to a user device such that the synchronization signal for the content platform is received and a synchronization signal for one or more other content platforms is disregarded to minimize interference due to synchronization information being transmitted from multiple sources.

9. The apparatus of claim 8, wherein the synchronization signal includes a transmitter identification and a timing parameter.

10. The apparatus of claim 8, wherein the transmitter device compare component is to generate a signal to direct the transmitter to transmit the synchronization signal to the user device.

11. The apparatus of claim 8, wherein the number generator number is generated pseudo-randomly.

12. The apparatus of claim 8, wherein the number generator number is generated randomly.

13. A method comprising:
receiving a trigger signal, wherein the trigger signal includes a timing parameter to be used by a user device to synchronize with a content platform;
generating a number generator number;
counting a counter number;
comparing the number generator number and the counter number; and
transmitting a synchronization signal including a transmitter identification and the timing parameter to determine the identity of the content platform with respect to one or more other content platforms such that a synchronization signal for the content platform is received and a synchronization signal for one or more other content platforms is disregarded to minimize interference due to synchronization information being transmitted from multiple sources.

14. The method of claim 13, further including,
detecting the synchronization signal; and
comparing the transmitter identification with a match identification.

15. The method of claim 14, further including,
synchronizing a user device utilizing the timing parameter.

16. The method of claim 15, wherein the synchronization signal is transmitted if the number generator number and the counter number are the same.

17. The method of claim 14, further including,
validating the synchronization signal if the transmitter identification matches the match identification.

18. The method of claim 14, wherein the number generator generates the number generator number pseudo-randomly.

19. The method of claim 13, further including,
extracting the transmitter identification and the timing parameter from the synchronization signal.

20. The method of claim 13, further including,
forwarding the timing parameter to a control system to synchronize a user device.

* * * * *